United States Patent [19]
Downing et al.

[11] Patent Number: 5,963,647
[45] Date of Patent: Oct. 5, 1999

[54] METHOD AND SYSTEM FOR TRANSFERRING FUNDS FROM AN ACCOUNT TO AN INDIVIDUAL

[75] Inventors: John Downing, Berks, United Kingdom; William M. Hernandez, West Palm Beach, Fla.; William D. Hooper, New Hope, Pa.; Netty Meiroff, Playa Del Rey; Jaithirth Rao, Los Angeles, both of Calif.; Rodman Reef, Larchmont, N.Y.; Howard A. Schechtman, Agoura Hills, Calif.; Edward Horowitz, Short Hills, N.J.

[73] Assignee: Citicorp Development Center, Inc., Los Angeles, Calif.

[21] Appl. No.: 08/877,203

[22] Filed: Jun. 17, 1997

Related U.S. Application Data

[60] Provisional application No. 60/040,298, Feb. 14, 1997.

[51] Int. Cl.$^6$ .................................................. H04L 9/00
[52] U.S. Cl. .................................. 380/24; 380/9; 380/25; 380/49; 705/35; 705/39; 705/42; 705/43; 705/44; 235/379; 235/380
[58] Field of Search .................................. 380/9, 23, 24, 380/25, 49, 50, 59; 705/1, 35, 39, 40, 41, 42, 43, 44; 235/379, 380

[56] References Cited

U.S. PATENT DOCUMENTS

| | | |
|---|---|---|
| 3,826,344 | 7/1974 | Wahlberg . |
| 4,321,672 | 3/1982 | Braun et al. ........................ 235/379 X |
| 4,341,951 | 7/1982 | Benton . |
| 4,498,000 | 2/1985 | Decavele et al. . |
| 4,529,870 | 7/1985 | Chaum . |
| 4,707,592 | 11/1987 | Ware . |
| 4,766,293 | 8/1988 | Boston . |
| 4,773,001 | 9/1988 | Blair et al. . |
| 4,926,368 | 5/1990 | Morita et al. . |
| 5,012,076 | 4/1991 | Yoshida . |
| 5,025,373 | 6/1991 | Keyser, Jr. et al. . |
| 5,326,960 | 7/1994 | Tannenbaum . |
| 5,350,906 | 9/1994 | Brody et al. . |
| 5,367,561 | 11/1994 | Adler et al. . |
| 5,420,926 | 5/1995 | Low et al. ................................ 380/24 |
| 5,424,938 | 6/1995 | Wagner et al. . |
| 5,440,634 | 8/1995 | Jones et al. . |
| 5,448,043 | 9/1995 | Nakano et al. . |
| 5,455,407 | 10/1995 | Rosen . |
| 5,457,305 | 10/1995 | Akel et al. . |
| 5,524,073 | 6/1996 | Stambler . |
| 5,590,196 | 12/1996 | Moreau ...................................... 380/18 |
| 5,650,604 | 7/1997 | Marcous et al. ........................ 235/379 |
| 5,677,955 | 10/1997 | Doggett et al. ........................... 380/24 |

OTHER PUBLICATIONS

International Search Report mailed Jun. 29, 1998.
PCT International Application, Publication No. WO 98/19261, Distributed On–Line Data Communications System and Method, May 7, 1998 (Priority Date Oct. 29, 1996).

*Primary Examiner*—Bernarr E. Gregory
*Attorney, Agent, or Firm*—George T. Marcou; Kilpatrick Stockton LLP

[57] ABSTRACT

Disclosed is a system and method for transferring funds. The invention supports funds transfers from a source account to a cash access file which can be accessed virtually twenty-four hours a day by both customers and non-customers. Access is achieved by the recipient entering a codeword selected by the sender, along with a transaction code randomly generated by the system. Once the sender provides the codeword and the transaction code to the recipient, the recipient can receive transferred cash through an ATM, even without using a card to access the system. Cash may be transferred across international borders and dispensed in a currency different than that of the sender's source account. Although cash is made available to a recipient virtually as soon as the requested transfer is approved and confirmed by the sender, the sender's account is not debited until the cash is actually received by the recipient. Other features, including security, cancellation, and status inquiries are also described.

47 Claims, 9 Drawing Sheets

FIG. 3

FIG. 4
TRANSFER INSTRUCTION FILE

METHOD AND SYSTEM FOR TRANSFERRING FUNDS FROM AN ACCOUNT TO AN INDIVIDUAL

CROSS-REFERENCE TO RELATED APPLICATIONS

This application claims benefit of Provisional Appln 60/040,298 filed Feb. 14, 1997.

This application relates to Ser. No. 08/795,355, entitled, "A CUSTOMER-DIRECTED, AUTOMATED SYSTEM FOR TRANSFERRING FUNDS BETWEEN ACCOUNTS USING A HOLDING ACCOUNT AND LOCAL PROCESSING," filed Feb. 4, 1995, now U.S. Pat. No. 5,825,003, which is a continuation-in-part of application Ser. No. 08/505,886, entitled, "A CUSTOMER-DIRECTED, AUTOMATED SYSTEM FOR TRANSFERRING FUNDS BETWEEN ACCOUNTS," filed Jul. 24, 1995, now U.S. Pat. No. 5,659,165. The respective disclosures of both Ser. Nos. 08/795,355 and 08/505,886 are hereby incorporated by reference.

FIELD OF THE INVENTION

This invention relates to a system and method for transferring funds to an individual. More particularly, the present invention relates to a system and method for transferring funds by assigning a password to funds to be transferred to a recipient so that the recipient can subsequently access the funds, for example through an automated teller machine or financial institution, by using the password.

BACKGROUND OF THE INVENTION

Within the financial service industry, recent times have witnessed expansive growth in customer-initiated account and cash access and payment systems. Perhaps most significantly, the prevalence of networks of automated teller machines (ATMs) has provided individuals with convenient, twenty-four hour a day access for such transactions as cash withdrawal and bill payment. Since the ATM networks of many financial institutions are interconnected, customers typically can perform transactions using the ATMs of other financial institutions in addition to those of their own local financial institution.

The widespread adoption of ATM networks has profoundly benefited consumers as they travel within areas serviced by such networks. Instead of having to plan ahead to have sufficient cash for extended trips, many consumers now carry less cash, confident in the ability to access cash through ATMs located at their destination. Thus, for example, a business person from New York who finds that his or her stay in Chicago has been extended unexpectedly can easily obtain additional cash through the ATM network even if there is no local affiliate of the business person's home financial institution.

Despite these benefits, there are many situations in which existing ATM networks are insufficient to meet the demands of the modern traveler. For example, international travel is increasingly common today. However, primarily because of the use of different currencies and disparities in controlling regulations promulgated by different governmental entities, international travelers typically are unable to expect that they will be able to access cash in an international destination. As a result, international travelers often are forced to carry a significant amount of cash or travelers checks in order to ensure that they will have significant funds for their trip. The traveler must either have exchange their home currency for the destination currency in advance, or during their trip make exchanges.

Further, notwithstanding the conveniences afforded by ATM networks, a significant number of consumers still do not have accounts which are accessible with an ATM card. For such consumers, even domestic trips outside the areas serviced by their home financial institution require that they carry enough cash for the duration of their trip.

As most people are all too familiar, such travelers often may find themselves in great distress when their cash is lost or stolen. In such circumstances, a traveler must obtain cash, for example by relying on a friend or family member to send money.

A typical way for this to happen is for the sender to "wire" the funds to the traveler. This process requires the sender to contact a financial institution and request that funds be transferred to a specific destination where the recipient is ready to receive the funds. For example, the recipient must locate a local office which is open and wait for the funds to arrive. Needless to say, many emergencies arise outside of normal business hours, and this manner of receiving funds often proves extremely inconvenient for both the sender and the recipient The situation may be much worse if no one is available to assist the traveler in distress. In such a case, the traveler often must locate a financial institution which is capable of receiving funds transferred from the traveler's home financial institution. The traveler often must provide identification information which is entered and then transmitted so that it may be authenticated and approved by the customer's home financial institution. This process creates several opportunities for errors to occur which may result in a delay in the customer's request. Should errors occur, manual intervention and investigation then becomes necessary. Again, such transfers are often much more complicated and burdensome where funds must be transferred across international borders.

U.S. Pat. No. 5,659,165 and U.S. Pat. No. 5,825,003 address some of these problems by extending the capabilities of an ATM network. U.S. Pat. No. 5,659,165 describes a system and method allows funds to be transferred from accounts between related financial institutions (for example, a first bank in the U.S. and an affiliated bank in Germany) or between accounts of two customers within the same financial institution. The method and system of the U.S. Pat. No. 5,825,003 further allows funds to be transferred from a first account to an external account serviced by another, unrelated financial institution (for example, from a customers account with a first bank in the U.S. to another customer's account with an unaffiliated bank in Germany). Both systems permit one to transfer funds across international borders in different currencies. Thus, through a global network operated by a common financial institution, a customer spending time in France can transfers funds from an account in New York to a second account in France. The customer in France can also transfer funds to other accounts, even those with other financial institutions in other countries. For example, the customer may transfer funds in German currency to another's account with a Bank B in Germany. Such transactions can be accomplished substantially in real time (excluding time for settlement).

Notwithstanding the advantages provided with the systems described in U.S. Pat. Nos. 5,659,165 and 5,825,003, a great number of travelers do not possess accounts with a financial institution that has a large, international network of ATMs. As a result, such travelers must resort to carrying a large amount of cash, thereby facing the risks described above.

It is noted that others have attempted to address some of the situations noted above. As a general matter, the proposed solutions are generally limited to the transfer of funds within the borders of a common governmental entity, and therefore do not address the complications that arise with the necessary exchange of currency and compliance with import/export regulations and other regulations on financial transactions. Further, many of the proposed solutions require a recipient to locate an office which is open and which is capable of receiving transfers, or, alternatively, have a card or equivalent means which permits the recipient to access an ATM or equivalent terminal.

It is known that EDS has advertised a funds transfer service referred to as "Z Cash." According to EDS, this service is available through ATM networks which support the service. A sender must first locate an ATM which supports the service and access the service, typically by inserting an ATM card or other card which initiates the ATM's services. The sender is prompted to input the amount to be sent and a numerical code. Funds are immediately debited from the senders account or from a credit card account. Once the request is made, a receipt is printed that includes a system-generated security code. The sender then contacts the recipient (for example, by telephone) to indicate that the funds are available and to provide the information necessary for the recipient to receive the funds (i.e., the necessary security code). The recipient must then locate a participating ATM which supports the service and access the finds that were previously withdrawn from the sender's account.

Additionally, U.S. Pat. No. 5,350,906 to Brody et al. and U.S. Pat. No. 5,326,960 to Tannenbaum also describes a funds transfer system which relies, at least in part, on an ATM network. A recipient accesses funds that have been previously withdrawn from the sender's account using a temporary ATM card and an identification number.

SUMMARY OF THE INVENTION

It is an object of the invention to address the shortcomings and limitations of the prior art through a method and system which provides more convenient funds transfer. More particularly, it is an object of the invention to provide a system and method which support funds transfers from a source account to a cash access file for cardless withdrawal by both customers and non-customers of a particular financial institution. It is a further object of the invention to provide a system and method by which such transfers may take place across international borders so as to provide quick and convenient access to funds, twenty-four hours a day, seven days a week. It is an additional object of the invention to ensure that funds transfers are made in a secure environment and in compliance with applicable regulations.

In accordance with the invention, there is a system and method for transferring funds. The invention supports funds transfers from a source account to a cash access file which can be accessed virtually twenty-four hours a day by both customers and non-customers. Access is achieved by the recipient entering a codeword selected by the sender, along with a transaction code randomly generated by the system. Once the sender provides the codeword and the transaction code to the recipient, the recipient can receive transferred cash through an ATM, even without using a card to access the system. With the invention, cash may be transferred across international borders and dispensed in a currency different than that of the sender's source account. Although cash is made available to a recipient virtually as soon as the requested transfer is approved and confirmed by the sender, the sender's account is not debited until the cash is actually received by the recipient.

These and other objects, features and advantages of the invention will be better understood from the ensuing description of exemplary preferred embodiments of the invention.

DETAILED DESCRIPTION OF THE PREFERRED EMBODIMENTS

The following description, made in reference to the drawings, illustrates a preferred system and method in accordance with the invention.

System Architecture

It is an advantage of the invention that it can be implemented in conjunction with existing system architecture. This permits the invention to be utilized in conjunction with ubiquitous ATM networks that provide twenty-four hour a day user access throughout much of the world. Further, it allows the invention to be implemented more easily through upgrades of existing architecture. Moreover, the invention may be offered in conjunction with other financial products and services, for example, those described in detail in the above-noted U.S. Pat. Nos. 5,659,195 and 5,825,003 so as to provide a variety of ways of transferring funds.

While many of the features of the invention could be adapted for use with conventional ATMs, in the preferred embodiment a special type of ATMs, referred to herein as Customer Activated Terminals (CATs), comprise the principle user terminal for customer access to the invention. As known in the art, a CAT is a particular type of ATM produced by, or on behalf of the assignee of the present invention. Unlike many other ATMs which function primarily or solely as cash dispensing machines, CATs provide access to range of financial products and services. These include "basic" services such as cash withdrawals, fund deposits, bill payments, fund transfers, balance inquiries, transaction histories, etc. Additionally, CATs support other services, such as brokerage functions.

Figure 1:
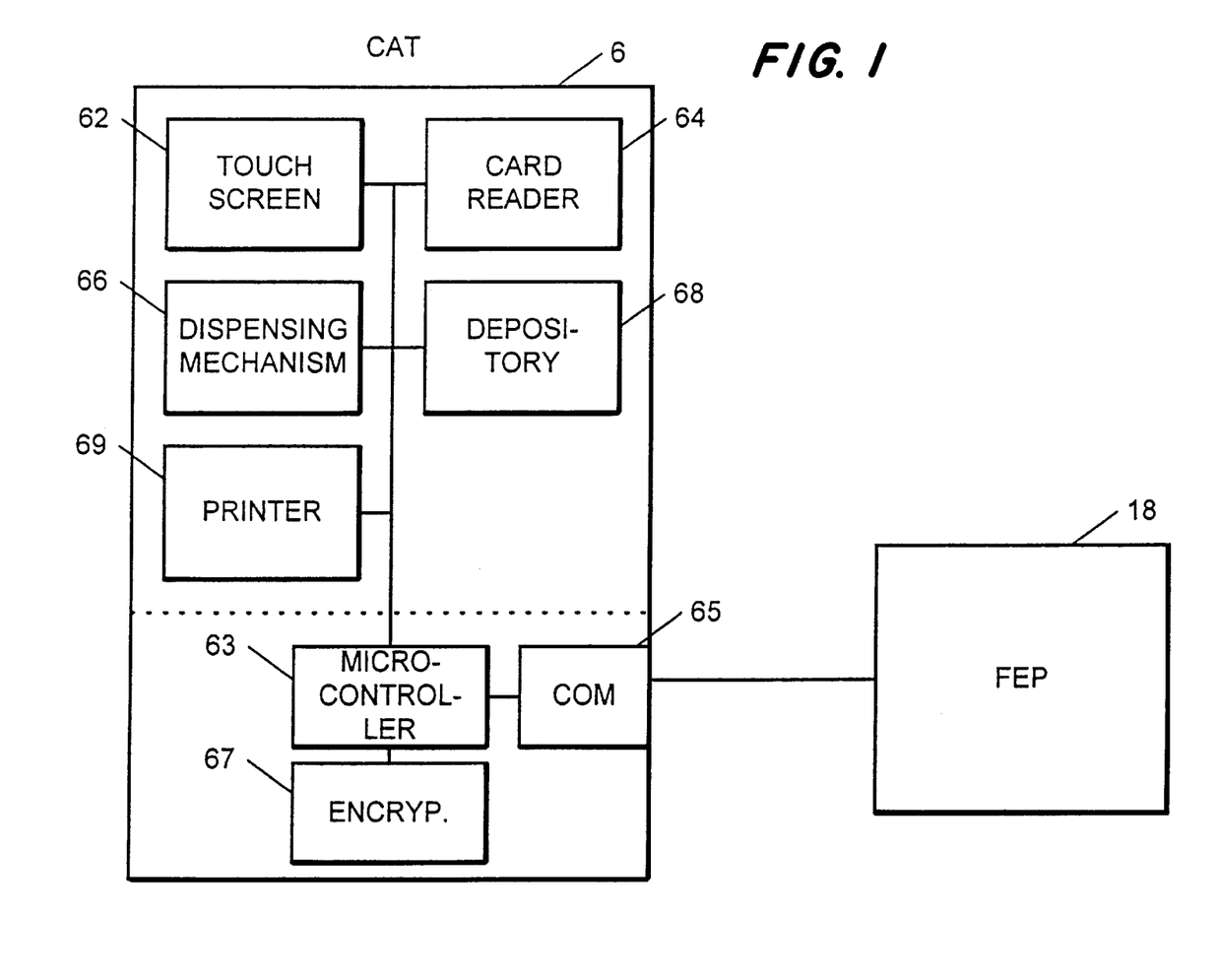
FIG. 1 is a block diagram of a standard customer activated terminal (CAT).

FIG. 1 illustrates some of the features of a standard CAT 6. Structures which generally correspond to those found in a conventional ATM include: a dip-type magnetic card reader 64 for reading information encoded on a customer's card; a depository 68 for accepting deposit and payment envelopes, a cash dispensing mechanism 66, and a printer 69. The CAT 6 also includes more advanced structures, such as a dynamic touch screen 62 that utilizes color graphics. This interface is more versatile than many other ATMs in that it is readily reconfigurable to accommodate newly developed functionality. It further provides an interactive display in which buttons and keys are replaced with images of familiar-three-dimensional objects, such as a keyboard.

The internal components of the CAT 6 include a microcontroller 63 and a communication device 65 for communication with a front end host system 18. As known in the art, a principle function of the microcontroller 63 is to control the display of information from the front end 18 and to convey the information input by the user with the card reader 64 and touch screen 62. The microcontroller also executes software that controls the operation of dispensing mechanism 66, the depository 68, and the printer 69.

As described in greater detail below, it is a feature of the invention that a sender who requests a funds transfer assigns a secret code or password for the receiver to use to access the funds. In order to maintain security, this password is encrypted locally at the CAT 6 before being sent to the front end system 18 in accordance with well known techniques. This function is generally illustrated in FIG. 1 by block 67.

Figure 2:
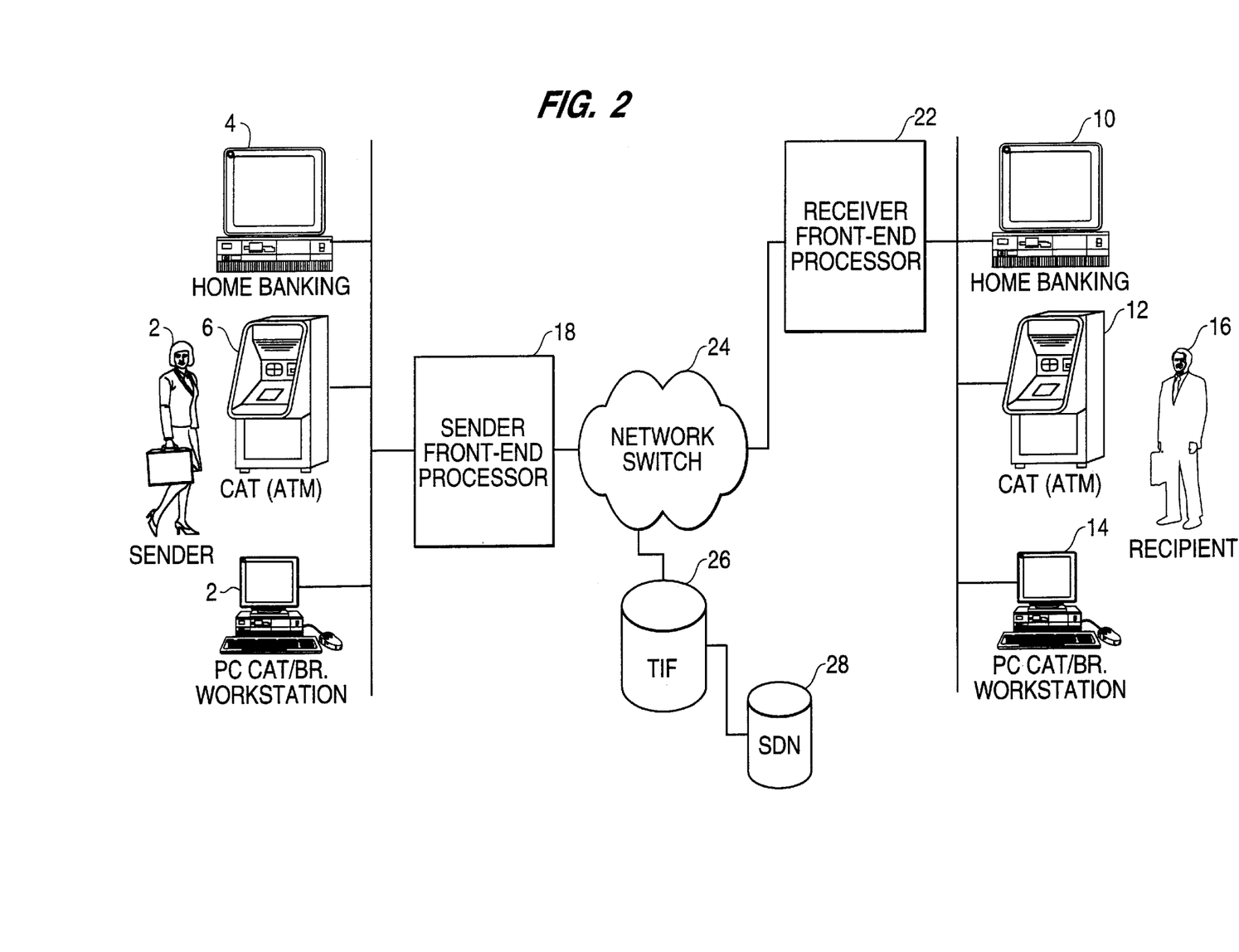
FIG. 2 is a block diagram of a system according to the invention.

FIG. 2 is a block diagram of a system 1 according to the invention. The system comprises a variety of access points comprising different terminals by which a sender 2 or a recipient 16 can access the system. For example, a sender 2 may access the system with a CAT 6 as described above in reference to FIG. 1, or an equivalent ATM. Alternatively, the system may be accessed through a personal computer (PC) serving as a home banking terminal 4. Additionally, a user terminal may comprise a PC or workstation 8 located within a secure branch site that is configured to operate as a CAT (referred to herein as a PCCAT).

It will be understood that other types of terminals also may be utilized in conjunction with the invention. For example, it is known to utilize a telephone to input information pertaining to a financial transaction using "tone" or dual tone multiple frequency (DTMF) signals. Other suitable terminals will be apparent to those skilled in the art. Moreover, it will be appreciated that transactions may be requested and funds received through branch offices instead of through the self-service terminals referred to above. Of course, it is anticipated that even assisted transactions made through a branch would ultimately be input to the system 1 so that the transferred funds would be available to the recipient through the system 1.

In the system 1, the various sender terminals 4, 6, and 8 and recipient terminals 10, 12, and 14 communicate with respective front-end processor (FEP) systems 18 and 22. As known in the art, an FEP typically is maintained by a particular financial institution, such as a local bank. The FEP provides service provider information and network control data to the terminals connected thereto. Conventionally, data is exchanged in a message format consisting of a request from the user terminal and a response from the FEP. Although only a sender FEP 18 and a recipient FEP 22 are shown, several FEPs are utilized to support thousands of user terminals connected together. The elements communicate in a manner known in the art through a communications network referred to generally as network switch 24.

In accordance with the invention, fund transfers are implemented with a Transfer Initiation File (TIF) 26 which is maintained by the system. As described below in greater detail, the TIF serves as a vehicle through which a self-withdrawal may be made by any recipient 16, whether or not the recipient is a customer of the sender's financial institution. According to one feature of the invention, the recipient may access funds through a CAT even without having a card (debit or credit card) as conventionally required.

The system according to the invention further maintains and utilizes a centralized Special Designation Nationals (SDN) file 28. This file is used by the system to validate requested transfers so as to comply with various laws and regulations, such as OFAC regulations.

System Operation

Figure 3:
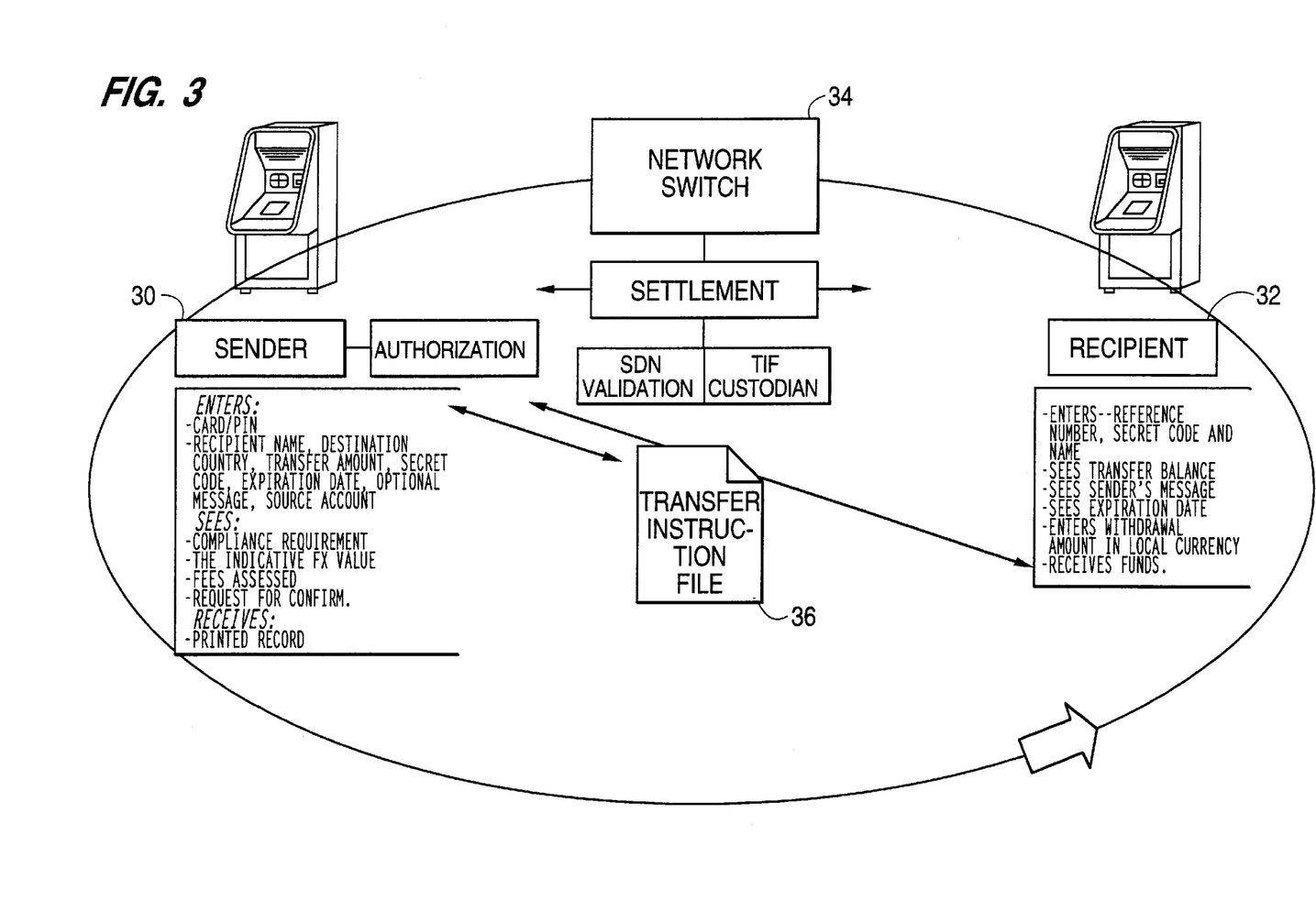
FIG. 3 is a block diagram illustrating the interaction among a sender terminal, a network switch and a recipient terminal in a system according to the invention.

FIG. 3 is a block diagram which provides an overview of the general functionality and interaction of three system components: (1) a sender terminal 32; (2) a network switch 34; (3) and a recipient terminal 32. It will be understood that the communication among these components are achieved in conjunction with the architecture shown generally in FIG. 2. Transfer protocols which may be utilized to exchange messages between each component are generally known in the art, and therefore are described merely by reference.

The sender enters a personal identification number (PIN) which is used along with information read from magnetically encoded information on the sender's card to authenticate the sender's request. The sender further enters information used to process the requested transfer, including: the sender's name; a secret code (preferably a number at least six characters in length which is entered twice to ensure accuracy); the transaction amount (as permitted subject to legal, currency and denomination restriction); the recipient's name; the address of the recipient; an optional message to the recipient; the destination country where the funds will be received; and the source account which is debited to cover the requested transfer amount and any associated fees. For simplicity, it may be desired to limit a sender to being able to select only a default currency corresponding to the destination country in multiples of the smallest denominations supported by the network in the destination country. For example, if the sender wishes to transfer funds to Germany, the system may limit the possible request amounts to multiples of ten deutche marks.

With the sender terminal, the system displays to the sender: global compliance requirements; any transfer limitations to the destination; any limitations on access to the funds in the destination country; the information entered by the customer; the transfer amount in the currency to be dispensed to the recipient; the equivalent transfer amount in the source currency of the sender's account; the recipient's name; the destination country; and any fees to be applied. The sender terminal further displays a message requesting the sender to confirm the transaction.

If the sender approves the transaction as displayed to the sender, the system provides a transfer confirmation reference number and displays the transaction amount in the destination currency. Transaction fees are deducted from the source account at this time, and the resulting source account balance is displayed to the sender. The funds are then logged by the system to the TIF 36 and the SDN is checked to comply with applicable regulations, such as international anti-terrorism identity checks and country specific regulations. Although not shown, it is preferred that the sender's FEP perform a fraud/MIS analysis to ensure transaction integrity.

Once the requested transaction has been confirmed and logged, the sender terminal prints a record of the transaction. This record shows the following: terminal ID, date and time; the transfer authorization amount in the destination currency; any transaction fee applied by the network; the transfer confirmation reference number; the recipient's name; and the balance of the source account.

It is preferable that the terminal block the transaction if the printer is inoperative at the time the transaction is requested and provide an explanatory message to the requester. If the printer becomes inoperative after the transaction has been processed, then the transaction should be reversed and an appropriate explanatory message provided to the sender.

Once the transfer is requested and approved in this manner, the sender must then contact the transfer recipient (for example, by telephone) and provide the following information: the secret code selected by the sender at the time the transfer was requested; the amount of the transfer; the transfer confirmation reference number generated by the system at the time the transfer was requested (and printed on the sender's receipt); and the expiration date of the transfer. While only the first three pieces of information must be entered to receive the cash, the expiration date should be conveyed to recipient so that the recipients is cognizant of the time limit that is in place.

As with the sender, it is a feature of the invention that the recipient may access the system with respect to the transaction through a variety of means, including through a self-service terminal with no requirement that the recipient even have a card to access the terminal. For example, self-service withdrawals may be made by a recipient using a terminal, such as a CAT, configured to present a user with the option to receive a cash transfer without requiring authentication in the conventional manner (i.e., with a card and PIN). In this manner, even non-customers may receive funds.

As illustrated in FIG. 3, a recipient uses a CAT to enter the reference number and secret code which were provided to the recipient by the sender, along with the recipient's name. Once this information is confirmed by the network, the recipient terminal displays the transfer balance, the expiration date and any optional message from the sender. It is a feature of the invention that the recipient may withdraw the entire amount of the transfer or a partial amount. Accordingly, the system prompts the user to input the amount to be received. Once this amount is entered (and, of course, assuming that the transaction has been authenticated), the requested amount is dispensed to the recipient in the currency of the country in which the recipient is located.

Settlement

As illustrated in FIG. 3, in addition to calculating foreign exchange (FX) rates and maintaining the SDN file and TIF, the network switch performs a settlement process among the financial institutions associated with the transaction. For example, if the sender requests a transfer at a CAT serviced by a bank in New York to a recipient in France, once the recipient withdraws funds in France (in francs), the network switch handles settlement for reimbursing the bank in France from which the funds were disbursed to the recipient.

It is a feature of the invention that settlement does not take place until the funds are actually withdrawn by the recipient. As a result, the source account is debited via electronic funds transfer (EFT) only once funds have been received by the recipient. Moreover, in cases where the destination currency differs from the currency of the source account, foreign exchange settlement also occurs only after the destination funds have been withdrawn. Thus, transfers made in accordance with the invention may be understood functionally as an "electronic check" where the sender remains the "owner" of the funds until they are picked up by the recipient. Any funds not accessed by the recipient remain in the sender's account until the requested transfer expires. Although requested funds remain in the account until settlement, it is preferable that fees associated with the transaction be immediately debited from the sender's source account once the transaction has been confirmed and approved.

Cancellation

It is an additional feature of the invention that the sender may cancel a pending transaction in the TIF at any time before the funds have been retrieved. In the case where partial funds have been received but some funds remain, the remaining funds will not be available to the receiver.

In order to cancel a transfer, the sender may access the system through any of the access points as described above. For self-service transactions, for example using a CAT, the sender must identify himself with a card and PIN. Once the identity of the sender is established in this manner, the sender enters the reference number for the transfer and request that it be canceled. In the event that the reference number has been forgotten, it is preferable to provide the recipient with the option of looking the reference number up through the system, for example, using a transaction journal entry as described below.

If a recipient attempts to access funds from a canceled transaction, the recipient will be informed, for example, through a message displayed on the screen of a CAT, that the sender canceled the transaction. In order to support this notification feature, cancellation notifications in the TIF should be held for the normal expiration period.

Transaction Status and History

Optionally, the system according to the invention may support status inquiries and transaction history requests by which the sender can inquire the status of a transfer. Status inquiries may be used to allow the sender to check the status of requested transfers using the reference number of the transaction. Thus, the sender may determine if any funds remain in the total amount transferred to the recipient.

Additionally, the system may support sender review of a transaction journal (TJ), that is, a history of recent transactions, including funds transfers made in accordance with the invention. Preferably, the information displayed to the sender as part of the transaction journal would comprise: the transaction date, time and terminal ID; the dispense transaction amount and currency code; the equivalent source transaction amount and currency code; the transaction reference number; and a transaction description (withdrawal, fee or canceled by sender).

Transfer Instruction File

As indicated generally in FIGS. 2 and 3, the system according to the preferred embodiment maintains information pertaining to a requested transaction through a TIF. The TIF is an important feature of the invention, supporting the invention's ability to effect transfers to both customers and non-customers in a convenient, secure manner. The TIF further supports the delayed settlement, cancellation, and transaction status and history features described above. It also serves provides a means to designate funds requested for transfer, while maintaining the sender's ownership of the funds until the recipient receives the funds and the sender's account is debited.

Figure 4:
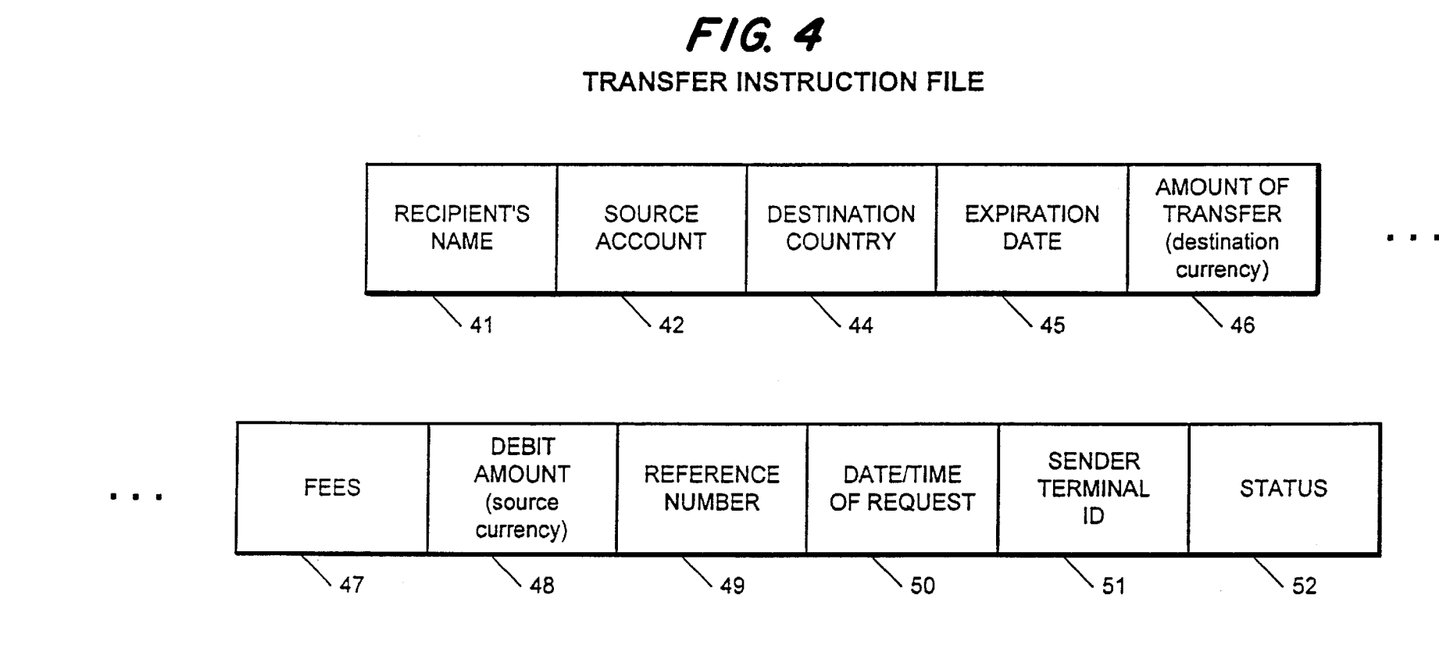
FIG. 4 is an illustration of the information regarding a transfer made in accordance with the invention as stored as an entry in a Transfer Instruction File.

FIG. 4 generally illustrates a TIF entry 40 corresponding to a particular transaction. The entry comprises several data elements corresponding to a transaction. These include information entered by the sender: the recipient's name 41, the source account selected by the sender 42; the destination country 44; and the expiration date of the transfer 45. The TIF entry also includes the amount of currency to be made available to the recipient at the destination location 46, any fees associated with the transaction 47, and the amount debited (or to be debited) from the sender's source account 48. The system also uses the TIF entry to maintain other information regarding the transaction, such as: the reference number automatically generated by the system (and provided to the sender) 49, the date and time of the sender's request 50; the terminal where the request was made 51, and the status of the funds 52. The status information 52 may include, for example, the date and time that any funds were accessed, the amount of any funds which remain available to the recipient, and the date and time of any request by the sender to cancel the transfer. The amount of any funds withdrawn by the customer is also maintained by the system. Of course, additional information may be included in the TIF.

It will be appreciated that the TIF provides a means by which the network can maintain a record of all transfers at a central location, thus facilitating processing of transactions which involve different currencies and different (but perhaps affiliated) financial institutions. The TIF further provides a convenient log for maintaining the funds until expiration or cancellation of the requested transfer. It also facilitates fraud detection and auditing.

Foreign Exchange

As referred to generally in FIG. 3, fund transfers made in accordance with the invention may involve two different currencies. In order to process such requests, it is necessary for the network switch to receive current foreign exchange rates for calculating currency conversion at the time of settlement. In the preferred embodiment, current foreign exchange rates are maintained by a separate component system of the network switch. This system operates in accordance with known principles to provide data elements corresponding to exchange rates to the processor which calculates the amount to be debited from the sender's account at settlement. These data elements are updated on a business date basis.

Security and Regulatory Compliance

It will be appreciated by those skilled in the art that the system and method of the invention requires an extensive data and message security review and support infrastructure to ensure that all legal, regulatory and fraud-related issues are in compliance. The invention addresses this concern in part with the above-mentioned Special Designated National (SDN) file. This file a compilation of information used for anti-terrorism and compliance with OFAT regulations regarding transfers. For example, information pertaining to the transaction, such as the recipient's name and address is matched against information stored in the SDN file. Moreover, requested destination countries are cross-referenced to access information stored within the SDN file corresponding to country specific limitations on transactions. Such limitations may include limits on transaction amounts, restrictions on wire transfers, or restrictions on self-service withdrawals (for example, cross-border withdrawals may be limited to branches only). This information from the SDN is applied at the time a request is made to ensure that it is in compliance with the regulations of specific jurisdictions.

In addition to complying with legal requirements, the invention addresses other security concerns. Each access point referred to in FIG. 2 includes resident processes to encrypt the authentication code used for each transaction. To protect against discovery of the authentication code chosen by sender, the system requires that it differ the sender's PIN. Moreover, transaction reference numbers generated by the system are randomly generated to prevent fraudulent access.

System security may be further enhanced to prevent unauthorized access to funds. In this regard, the system may restrict attempts to access funds to a predefined number. For example, a recipient may be allowed three attempts to input the correct recipient information, including secret code and transfer confirmation reference number. After three incorrect attempts, the system flags the transaction so that it is inaccessible until the next business day. If this happens for three consecutive days, the transfer will be rejected.

Additionally, the invention may incorporate a transaction log file of all withdrawal transactions which can be used to track fraudulent transactions and for auditing. Such a file may include an identification of the terminal and financial institution identification through which the withdrawal took place, the date and time of the withdrawal, the transaction amount and the currency code. This records all activity and can be used to track fraud.

Interface

Figure 5A:
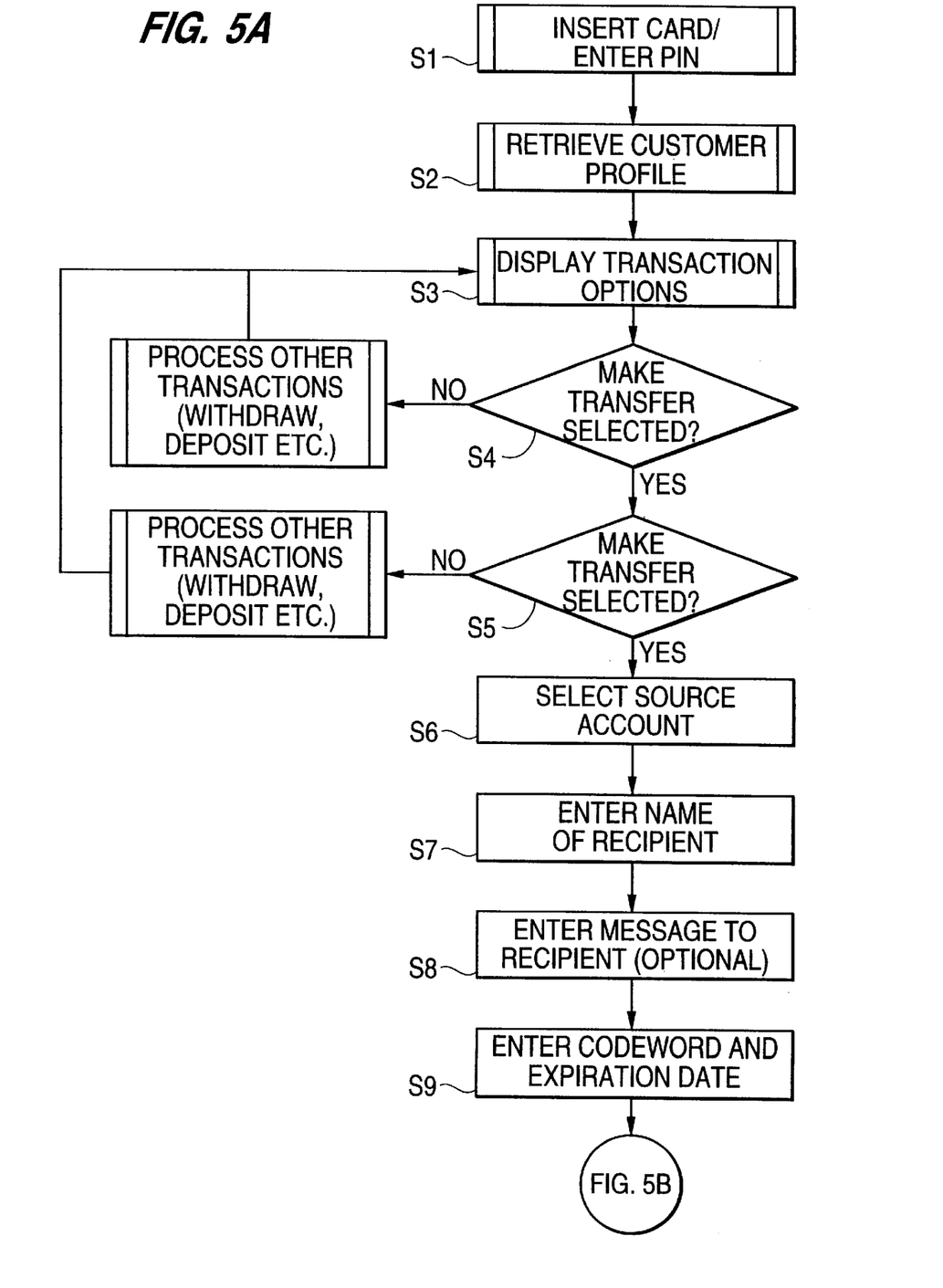
FIGS. 5A to 5C are flow charts illustrating a method of requesting a funds transfer using a customer activated terminal.
Figure 5B:
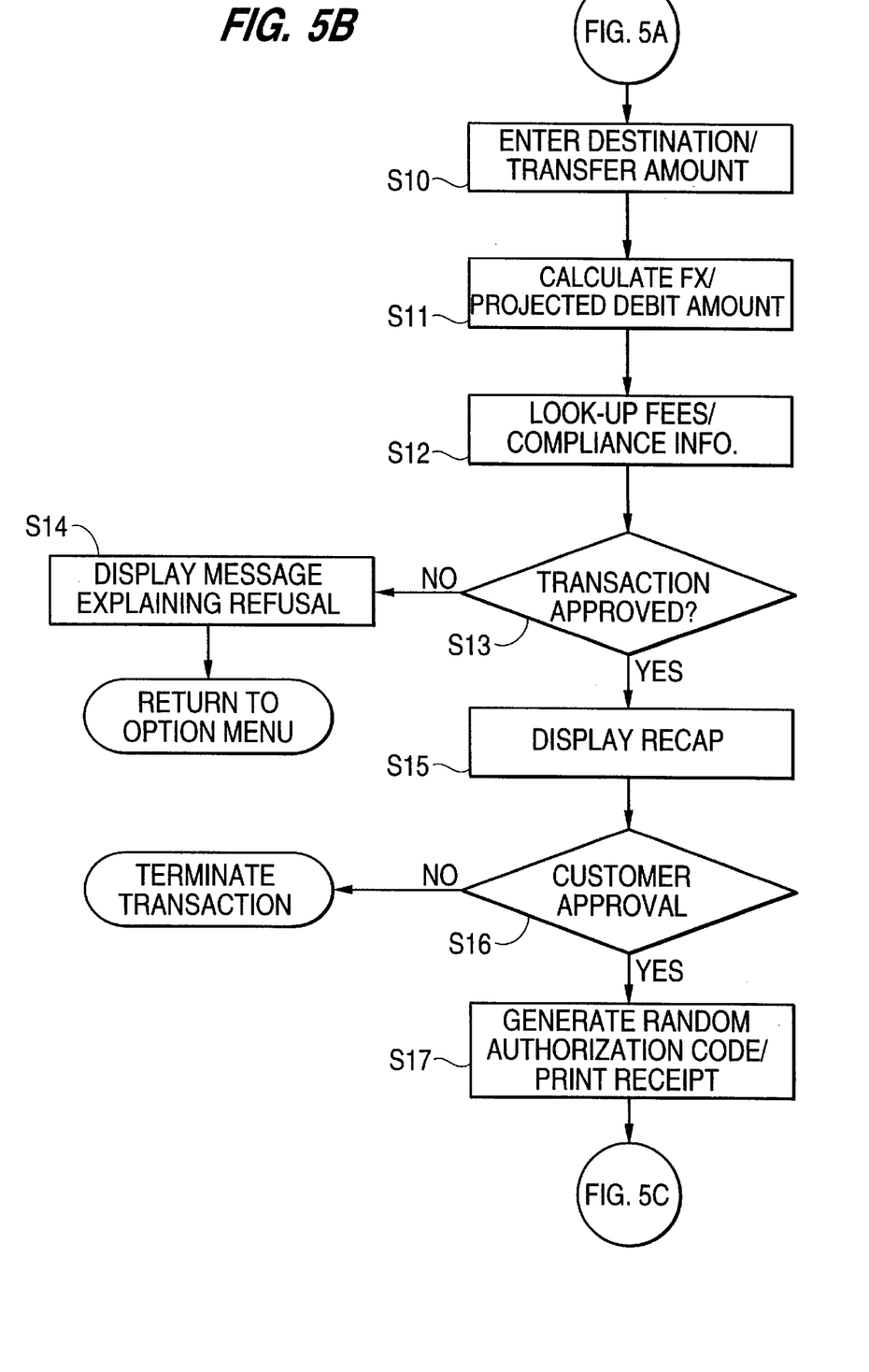
Figure 5C:
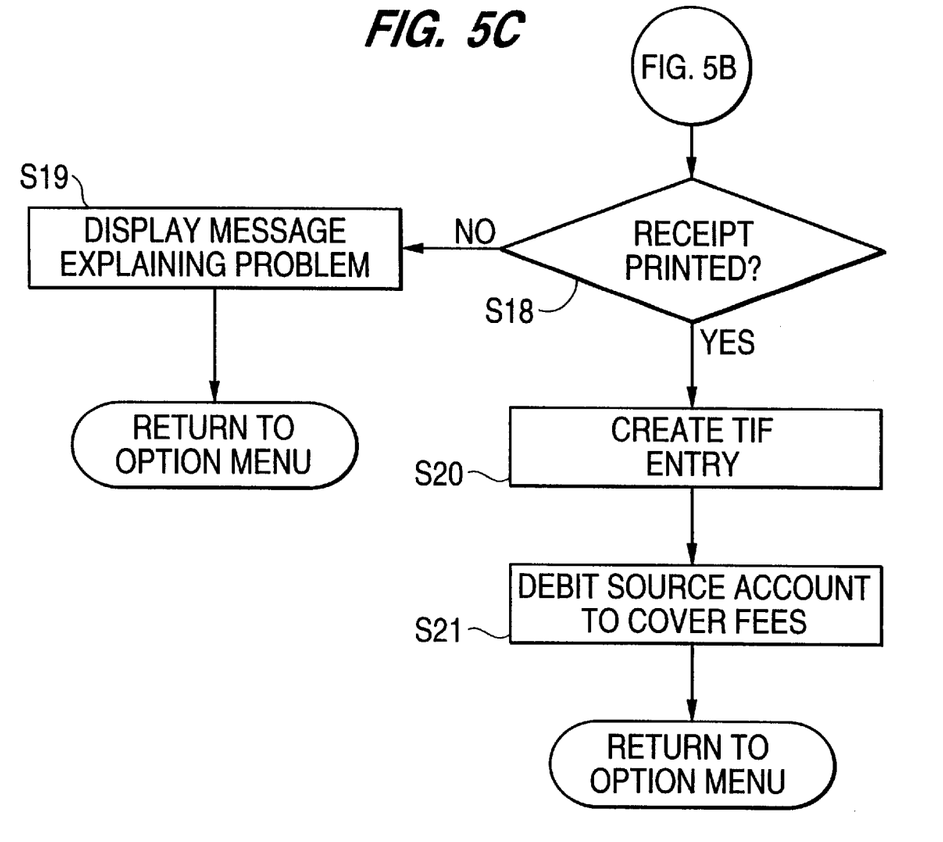
Figure 6A:
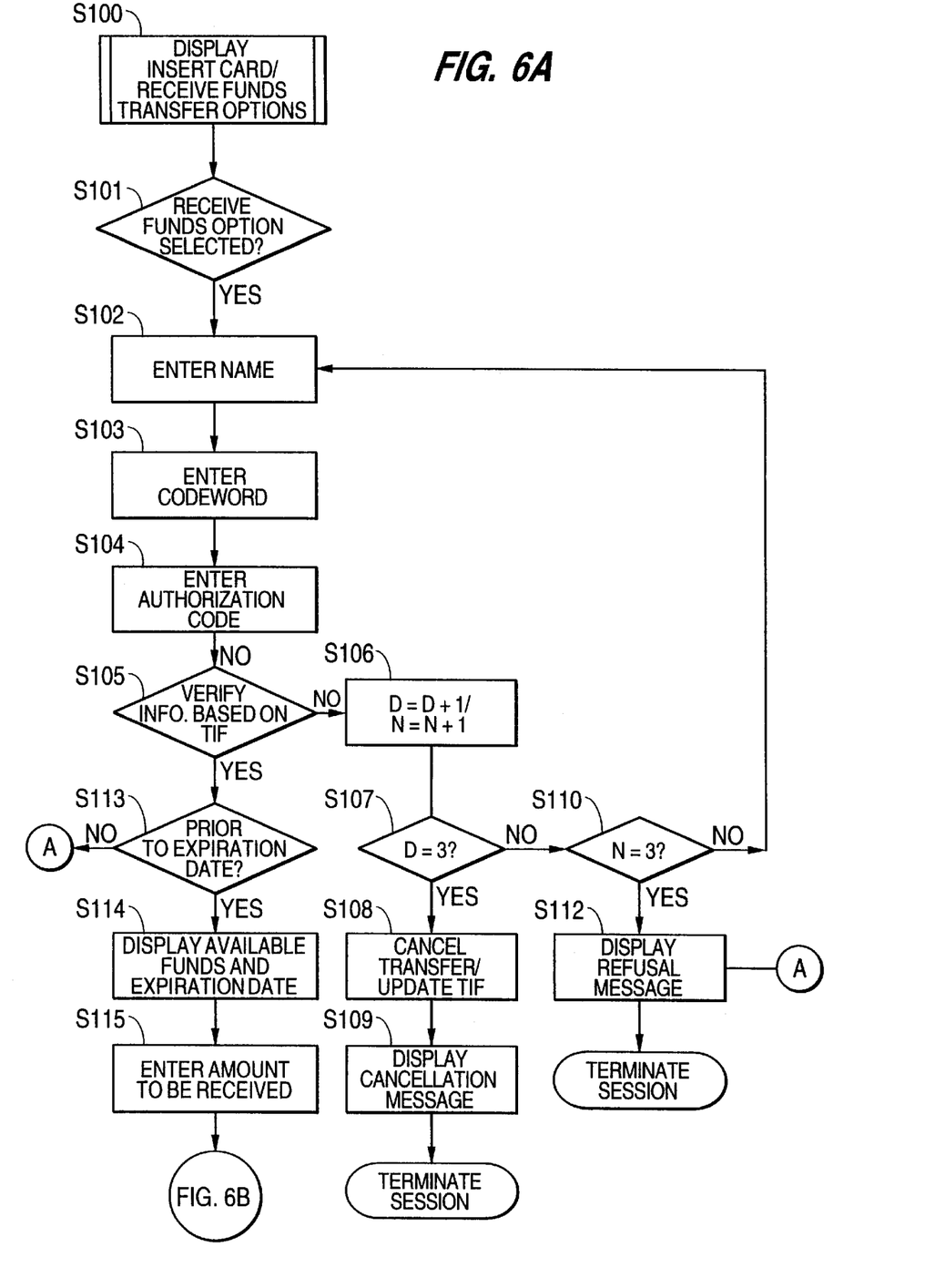
FIGS. 6A and 6B are flow charts illustrating a method of receiving transferred funds using a customer activated terminal.
Figure 6B:
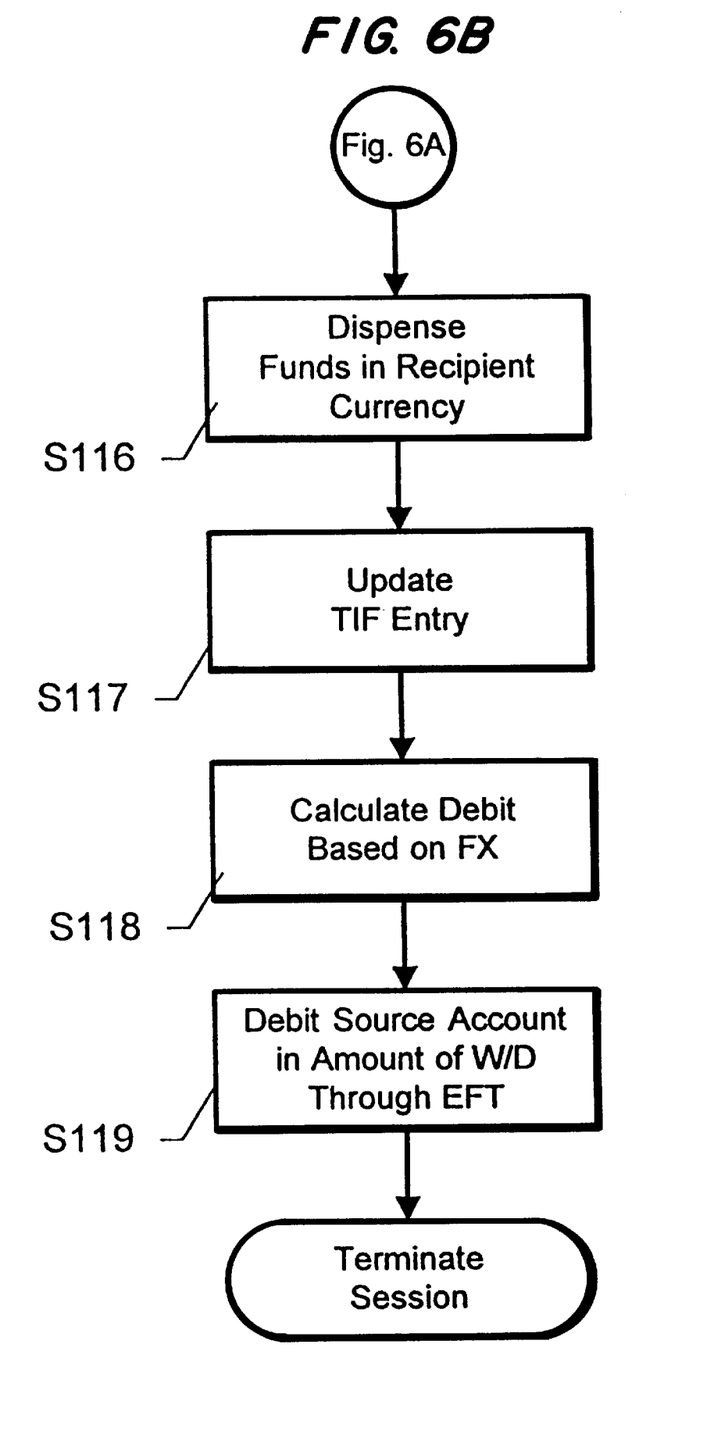

Now that the features of the invention have been described in reference to FIGS. 1 to 4, exemplary methods of requesting a funds transfer or making a withdrawal of transferred funds are described respectively in reference to FIGS. 5 and 6. In these examples, the principle user interface is preferably a CAT. As noted above, this type of terminal is advantageous in that it is user-friendly, can be easily reconfigured, and supports entry of alphanumeric data with virtual keyboards displayed on a touch screen. Moreover, CATs are easily configured to support user access even without the use of a card and PIN.

The reconfigurabilty of CATs is particularly advantageous in the context of the invention since it permits the invention to be implement by modification of existing system architecture. It also permits the features of the invention to be offered in conjunction with other financial products and services, such as those described in the above referenced U.S. Pat. Nos. 5,659,165 and 5,825,003. Despite these advantages, it will be appreciated that the invention may also be used in connection with other terminals, such as conventional ATMs.

1. Sender Transactions

FIGS. 5A to 5C are flow charts which illustrates a process by which a sender requests a fund transfer using a CAT. At S1, a user session is initiated by the sender dipping the sender's card in the card reader and entering the sender's personal identification number (PIN) with the touch screen. Once the PIN and the information read from the magnetic stripe on the sender's card have been forwarded to the FEP, at S2 the FEP responds by providing the cardholder's profile to the CAT. This profile indicates the accounts which the cardholder may access and other information.

Once the sender has input this information to establish authorization to proceed, the CAT presents a variety of options, such as withdraw cash, transfer funds, make payments, get information, etc. For purposes of this discussion, a description of other options is omitted. A full description of other features that can be offered together with the invention through a CAT or other ATM may be found, for example, in the disclosure of the U.S. Pat. Nos. 5,659,165 and 5,825,003 which are hereby incorporated by reference.

In the preferred embodiment of the invention, the selection of "making transfers" results in the sender being presented with a variety of options, including the option of cash transfers made in accordance with the invention. Other options may include transfers made in accordance with the techniques described in U.S. Pat. Nos. 5,659,165 and 5,825,003.

Once the user selects the option of making a transfer in accordance with the invention at S5, the terminal prompts the user to select a particular type of source accounts from a list of possible types. Upon selection of the type of source account at S6, the CAT prompts the user to select from a list of the user's own accounts, for example, by displaying the account number and the type of currency associated with it.

Once the user has identified the source account for the transfer at S7, the CAT then prompts the user to enter the name of the intended recipient. For this purpose, the CAT may display a standard keyboard which permits the user to "type" in the name of the recipient. Optionally, the user may be prompted to type in a message to the recipient at S8.

Next, at S9 the user is prompted to select a secret codeword and an expiration date for the transfer. Again, a CAT is advantageous in that it permits the user to use a virtual keyboard so that codeword may comprise an easily remembered sequence of alphanumeric characters. Of course, a simple numeric sequence could also be used.

At S10, the user is next prompted to select the geographical destination of the transfer and the requested transfer amount in some multiple of the lowest denomination available for distribution in the currency of the selected destination country. It will be understood that this step may be performed in a variety of ways. For example, a list of potential destination countries (or other geographic regions) could be stored locally in the CAT along with a table which indicates the smallest denomination available in the currency of a selected destination. Alternatively, this information could be stored in the FEP or the network switch and communicated to the CAT.

Once the user has entered the information described above, it is forwarded to the network switch which calculates the applicable foreign exchange rate for the currency of the source account and the currency of the selected destination at S11. Using this rate, the system calculates the projected amount to be debited from the source account in the currency of the source account. At S12, the network further consults a table to determine the applicable fees and any compliance information that should be displayed to the user.

At S13, the network switch also reviews the requested transaction by comparing some of the information, such as the recipients name with information stored in the SDN file. Based on this check, the network switch may selectively decline or approve the requested transaction. If it is declined, as shown at S14, an explanatory message is displayed by the CAT and the user is provided with the option of selecting other transactions.

If the transaction is approved, the network switch forwards the compliance notices and the foreign exchange amount to the CAT via the FEP.

At S15, the CAT uses the information received from the network switch to provide a recap of the user's request, including all fees and the projected debit to the selected source account. The CAT further displays any notices or other information required for compliance with legal requirements. At S16, the user is then asked if the user wishes to proceed with the requested transaction.

If the user indicates that the user does wish to proceed with the requested transaction at S17, the CAT randomly generates an authorization code which is displayed to the user. CAT also attempts to print a record of the transaction for the customer. Preferably, this record includes the terminal ID number of the CAT, the date and time of the transaction, the authorization code, and the amount of the transfer.

The CAT then determines at S 18 whether the record has been printed. If not, at S19 the CAT displays a message to the user explaining the problem, and cancels the transaction. If the record is printed, at S20 the CAT forwards the information regarding the requested transfer to the network switch, which in turns creates an entry to the TIF regarding the requested transaction. For example, this entry includes the information shown in FIG. 4. At S21, the fee amount is debited from the selected source account.

It will be understood that the foregoing is merely one example of a method for requesting a transfer. Those skilled in the art will appreciate that the particular sequence of the steps may be modified without departing from the invention.

2. Receive Cash

FIGS. 6A and 6B are flow charts illustrating an example of a method by which a recipient may receive transferred funds through a CAT. Again, it is noted a recipient may also receive funds at a particular destination in other ways, for example, through a branch location.

At S100, a CAT displays a funds transfer option. This permits the user to receive cash without inputting a PIN and card in the conventional manner. At S101, the CAT detects whether the receive funds option is selected. If so, the user is prompted at S102, S103, and S104 to enter the user's name, codeword and authorization code as provided previously by the transferor.

At S105, the information entered by the user is encrypted and communicated to the network to verify that the information matches that stored in the TIF. If the information is incorrect, a count D of the number of days attempted and a count N of the number of attempts is incremented at S106. If (as shown at S107) the user has entered incorrect information three consecutive days, the requested transfer is canceled (i.e., the funds are no longer available), the TIF is updated accordingly (S108), and a cancellation message is displayed (S109). If the number of incorrect attempts N reaches three (S110), a message is displayed indicating that the requested transfer has been refused (S112) and the session is terminated. In such a case, the user may try again the next day, thereby affording authorized users the opportunity to contact the transferor to obtain the correct information.

At S113, the system checks the information from the TIF to determine whether the requested transfer has expired. If not, at S114 the CAT displays the amount of available funds and the expiration date. At S115, the recipient enters the amount to be received. Thus, the recipient can access less than the full amount transferred. The remaining balance may be accessed at a later date so long as it is prior to the expiration date.

At S116, the CAT displays the requested amount in the currency of the destination CAT. The CAT then requests an update to the TIF to reflect the withdrawal (S117). The system calculates the applicable debit amount, based on the applicable foreign exchange at S118. The amount of the withdrawal is debited from the source account S119 in accordance with known techniques. Preferably, the debit is made by electronic funds transfer through the automated clearinghouse procedure of the source country.

It will be appreciated that the present invention provides many advantages. Users benefit through the availability of convenient and widespread access to transferred cash. Cash may be transferred across international borders, even to non-customer recipients. The transfers may be made virtually in real time (of course, time must be permitted for the sender to convey the authorization code and password to the recipient).

Additionally, the service provider benefits from the preferred invention. Apart from the goodwill generated by the invention, the service provider may charge service fees to the recipient and other appropriate fees.

A system and method for implementing funds transfers has now been described in fulfillment of the foregoing objects of the invention. Although the detailed description of the invention has been made in reference to the specific examples set forth above, many variations, modifications and alterations will be apparent to those skilled in the art without departing from the spirit and scope of the invention. The following claims are intended to encompass any such variations, modifications and alterations.

What is claimed is:

1. A method of transferring funds from a source account using a network, the network including a plurality of user terminals, comprising:

receiving at one of the plurality of user terminals a selection for a transfer of funds to a recipient, the selection including transfer data, wherein the transfer of funds is conditioned upon receiving a request for funds and matching recipient data from one of the plurality of user terminals, the transfer data including at least a security code, an amount to be transferred, and an identification of the source account from which the transferred funds are to be debited, and the recipient data including at least a matching security code and identification information;

storing the transfer data as an entry in a transfer instruction file, the transfer instruction file being accessible by a processor;

receiving from one of the plurality of user terminals the request for transfer of funds, the request including received recipient data;

transmitting the request to the processor;

the processor checking the request, the checking including checking the transfer data and the received recipient data;

upon confirmation, transmitting an instruction to the network to transfer funds;

transferring for receipt by the recipient funds in an amount not greater than the amount to be transferred; and debiting the source account in an amount at least as great as the amount transferred.

2. The method according to claim 1, wherein the transfer data includes an identification of a destination country.

3. The method according to claim 2, wherein currency of the destination country differs from currency of the source account.

4. The method according to claim 3, further comprising calculating the amount to be debited from the source account in the currency of the source account on the basis of an exchange rate between the currency of the source account and the currency of the destination country.

5. The method according to claim 1, wherein transferring for receipt by the recipient includes transferring of funds for receipt by an ATM configured to dispense funds transferred by the sender without requiring the use of a card to access the system.

6. The method according to claim 1, further comprising providing the sender with a receipt indicating the amount of a requested transfer and an authorization code.

7. The method according to claim 1, further comprising:

generating an authorization code at the time the sender requests the transfer of funds; and storing the authorization code with the transfer data in the transfer instruction file, wherein the authorization code and the security code must be received in order to access the transferred funds.

8. The method according to claim 1, wherein the security code is encrypted at a user terminal before being transmitted to other elements of the network.

9. The method according to claim 1, further including evaluating whether a requested transaction complies with predetermined limitations on funds transfers.

10. The method according to claim 9, wherein the predetermined limitations include amount limitations.

11. The method according to claim 10, wherein evaluating includes comparing the received transfer data with data stored in a special designation nationals file.

12. The method according to claim 1, wherein the transfer data includes data corresponding to an expiration date for a requested transfer, whereby a recipient can receive transferred funds only prior to the expiration date.

13. The method according to claim 1, further comprising determining whether funds have been received by checking the status of the requested transfer as maintained in the transfer instruction file.

14. The method of claim 1, wherein the processor comprises a network switch.

15. The method of claim 1, wherein the one of the plurality of user terminals from which matching recipient data is received is distinct from the one from the plurality of user terminals from which the request to transfer funds is received.

16. A funds transfer system including a source account and a network, the network including a plurality of user terminals, comprising:

means for receiving at one from the plurality of user terminals a selection for transfer of funds to a recipient, the means for receiving including means for submitting transfer data, wherein the transfer of funds is conditioned upon receiving a request for funds and matching recipient data from one of the plurality of user terminals, the transfer data including at least a security code, an amount to be transferred, and an identification of the source account from which the transferred funds are to be debited, and the recipient data including at least a matching security code and identification information;

means for storing the transfer data as an entry in a transfer instruction file, the transfer instruction file being accessible by a processor;

means for receiving from one of the plurality of user terminals the request for transfer of funds, the request including received recipient data;

means for transmitting the request to the processor;

means for the processor checking the request, the means for checking including means for checking the transfer data and the received recipient data;

means for, upon confirmation, transmitting an instruction to the network to transfer funds;

means for transferring for receipt by the recipient funds in an amount not greater than the amount to be transferred; and means for debiting the source account in an amount at least as great as the amount transferred.

17. The system according to claim 16, wherein the transfer data includes an identification of a destination country.

18. The system according to claim 17, wherein currency of the destination country differs from currency of the source account.

19. The system according to claim 16, further including means for calculating the amount to be debited from the source account in the currency of the source account on the basis of an exchange rate between the currency of the source account and the currency of the destination country.

20. The system according to claim 16, wherein the means for transferring includes means for transferring to an ATM configured to dispense funds transferred without requiring use of a card to access the system.

21. The system according to claim 16, further comprising means for providing a receipt indicating the amount of a requested transfer and an authorization code.

22. The system according to claim 16, further comprising:
means for generating an authorization code at the time of the request for the transfer of funds; and
means for storing the authorization code with the transfer data in the transfer instruction file, wherein the authorization code and the security code must be received in order for access the transferred funds to be provided.

23. The system according to claim 16, wherein the security code is encrypted at a user terminal before being transmitted to other elements of the network.

24. The system according to claim 16, further including means for evaluating whether a requested transaction complies with predetermined limitations on funds transfers.

25. The system according to claim 24, wherein the predetermined limitations include amount limitations.

26. The system according to claim 24, wherein the means for evaluating includes means for comparing the transfer data entered by the sender with data stored in a special designation nationals file.

27. The system according to claim 26, wherein the transfer data includes data corresponding to an expiration date for a requested transfer, wherein funds are transferrable only prior to the expiration date.

28. The system according to claim 16, further comprising means for checking the status of the requested transfer as maintained in the transfer instruction file to determine whether funds have been transferred.

29. The system of claim 16, wherein the processor comprises a network switch.

30. The system of claim 16, wherein the one of the plurality of user terminals from which matching recipient data is received is distinct from the one from the plurality of user terminals from which the request to transfer funds is received.

31. A system for transferring funds comprising:
a source account;
a transfer instruction file stored within the system, the transfer instruction file containing entries each corresponding to a requested transfer of funds; and
a network for transferring funds to a recipient, the network including:
a plurality of user terminals; wherein transfer data for authorizing the transfer of funds to a recipient is receivable via at least one of the plurality of user terminals, the transfer data including identification information for the recipient, a security code, an amount to be transferred, and an identification of a source account from which the transferred funds are to be debited; and wherein recipient data for a recipient request for transfer of funds is receivable via at least one of the plurality of user terminals upon receipt of recipient data; and wherein at least one of the plurality of user terminals provides access to the requested funds; and
a processor for processing electronic data received from the plurality of terminals and for providing access to at least one financial account and for accessing the transfer instruction file, wherein the processor confirms the request to transfer funds and transmits an instruction to the network to transfer funds after checking the recipient data, the checking including checking the transfer data and the recipient data; and
a plurality of couplings for coupling the network to the source account, and for transmitting the transfer data, the recipient data, and the instruction to the network to transfer funds, and an instruction to debit the source account;
wherein the transferred funds are provided to the recipient at one of the plurality of user terminals upon the transfer data and recipient data being received and checked.

32. The system according to claim 31, wherein the source account is debited upon the recipient receiving the transferred funds.

33. The system according to claim 31, wherein the plurality of user terminals includes a printer for printing a receipt for a sender once the sender requests a transfer of funds, the receipt indicating the amount of the transfer and an authorization code.

34. The system according to claim 31, wherein once a sender requests a transfer of funds, the sender is provided with an authorization code which is stored in the transfer instruction file, and wherein the recipient must enter the authorization code and the security code in order to access the funds.

35. The system according to claim 31, wherein the security code is encrypted at a user terminal before being transmitted to other elements of the system.

36. The system according to claim 31, further including means to evaluate whether a requested transaction complies with predetermined limitations on fund transfers.

37. The system according to claim 36, wherein the predetermined limitations include amount limitations.

38. The system according to claim 36, wherein the means to evaluate include a special designation nationals file containing information which is compared to the transfer data entered by the sender.

39. The system according to claim 31, wherein the transfer data includes data corresponding to an expiration date for a requested transfer, whereby a recipient can receive transferred funds only prior to the expiration date.

40. The system according to claim 31, wherein the transfer instruction file is accessed by the sender to determine whether funds have been received by the recipient.

41. The system of claim 31, wherein the processor comprises a network switch.

42. The system of claim 31, wherein the one of the plurality of user terminals from which matching recipient data is received is distinct from the one from the plurality of user terminals from which the request to transfer funds is received.

43. The system of claim 31 further comprising:
a second network for a recipient to receive transferred funds, the second network including a second plurality of user terminals and a second front end processing system for processing electronic data received from the second plurality of terminals; and
a host communications network for exchanging electronic data between the first network and the second network.

44. The system according to claim 43, wherein the transfer data includes an identification of a foreign country.

45. The system according to claim 44, wherein currency of the destination country differs from currency of the source account.

46. The system according to claim 43, wherein the host communications network includes a system which provides data corresponding to a current currency conversion rate for calculating exchange rates between currency of a destination country and currency of the source account.

47. The system according to claim 43, wherein the second plurality of user terminals include an ATM configured to permit a user to withdraw funds transferred without requiring the use of a card to access the system.

* * * * *